US006552844B2

United States Patent
Lim

(10) Patent No.: US 6,552,844 B2
(45) Date of Patent: Apr. 22, 2003

(54) PASSIVELY OUTPUT FLATTENED OPTICAL AMPLIFIER

(75) Inventor: Jin Hong Lim, Breinigsville, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/871,912

(22) Filed: Jun. 1, 2001

(65) Prior Publication Data

US 2002/0181080 A1 Dec. 5, 2002

(51) Int. Cl.[7] .............................................. H04B 10/12
(52) U.S. Cl. .................... 359/337.1; 359/341.1
(58) Field of Search ......................... 359/337.1, 337.2, 359/339, 341.1

(56) References Cited

U.S. PATENT DOCUMENTS

| 3,909,749 A | * | 9/1975 | Weber ......................... 359/244 |
| 4,723,248 A | | 2/1988 | Harter et al. .................. 372/55 |
| 4,778,237 A | | 10/1988 | Sorin et al. ............... 350/96.15 |
| 4,973,125 A | * | 11/1990 | Normandin .................. 385/122 |
| 5,050,949 A | | 9/1991 | DiGiovanni et al. ........ 359/341 |
| 5,080,469 A | | 1/1992 | McCahon et al. ........... 359/241 |
| 5,088,095 A | | 2/1992 | Zirngibl .......................... 372/6 |
| 5,155,780 A | | 10/1992 | Zirngibl ........................ 385/27 |
| 5,177,634 A | | 1/1993 | Way .............................. 359/341 |
| 5,187,610 A | * | 2/1993 | Habbab et al. .............. 359/337 |
| 5,239,607 A | | 8/1993 | da Silva et al. ............. 385/122 |
| 5,278,855 A | | 1/1994 | Jacobovitz-Veselka et al. ............ 372/44 |
| 5,315,573 A | | 5/1994 | Nakao et al. ................ 369/100 |
| 5,412,744 A | | 5/1995 | Dragone ........................ 385/24 |
| 5,436,760 A | | 7/1995 | Nakabayashi ................ 359/341 |
| 5,506,724 A | | 4/1996 | Shimizu et al. ............... 359/341 |
| 5,526,175 A | | 6/1996 | Minelly et al. .............. 359/341 |
| 5,530,584 A | | 6/1996 | Myslinksi et al. ........... 359/341 |
| 5,579,153 A | | 11/1996 | Laming et al. .............. 359/341 |
| 5,706,377 A | | 1/1998 | Li .................................. 385/37 |
| 5,798,853 A | * | 8/1998 | Watanabe .................... 359/160 |
| 5,815,330 A | * | 9/1998 | Becker ......................... 118/726 |
| 5,838,487 A | | 11/1998 | Nilsson et al. .............. 359/341 |
| 5,887,091 A | | 3/1999 | Jabr et al. ..................... 385/24 |
| 6,049,413 A | | 4/2000 | Taylor et al. ................ 359/332 |
| 6,057,959 A | | 5/2000 | Taylor et al. ................ 359/341 |
| 6,204,958 B1 | | 3/2001 | Taylor et al. ................ 359/337 |
| 6,205,164 B1 | | 3/2001 | Ohishi et al. ................. 372/70 |
| 6,252,892 B1 | * | 6/2001 | Jiang et al. .................... 372/10 |
| 6,266,173 B1 | * | 7/2001 | Hayes ......................... 359/119 |
| 2001/0017728 A1 | * | 8/2001 | Kitabayashi et al. ........ 359/337 |

FOREIGN PATENT DOCUMENTS

WO          WO 97/08585    *    3/1997

OTHER PUBLICATIONS

P.C. Becker. "Erbium–Doped Fiber Amplifiers: Fundamentals and Technology." Academic Press, San Diego, 1999, pp. 251–319.*

(List continued on next page.)

Primary Examiner—Thomas G. Black
Assistant Examiner—Andrew R. Sommer

(57) ABSTRACT

An optical amplifier and communications system for amplifying an input signal and providing an output signal includes a nonlinear light absorber for passively controlling the level of the output signal. The nonlinear light absorber provides an approximately constant output signal level independent of the level of the input signal.

13 Claims, 4 Drawing Sheets

OTHER PUBLICATIONS

Mahdi et al. "A novel design for broadband fiber amplifier." TENCON 2000, Sep. 2000, pp. 410–413.*

Kitabayahi et al. "Active Gain–Slope Compensation of EDFA using Thulium–Doped Fiber as Saturable Absorber." IEICE Trans. Electron. vol. E84–C, No. 5, May 2001, pp. 605–609.*

V.L. da Silva, et al., "Automatic Gain Flattening in Optical Fiber Amplifiers Via Clamping of Inhomogeneous Gain," IEEE Photonics Technology Letters, vol. 4, No. 4, Apr. 1993, pp. 412–414.

S. Yamashita and T. Okoshi, "Performance Improvement and Optimization of Fiber Amplifier with A Midway Isolator," IEEE Photonics Technology Letters, vol. 4, No. 11, Nov. 1992, pp. 1276–1278.

Hirotako Ono, et al., "Gain–Flattened $Er^{3+}$–Doped Fiber Amplifier for a WDM Signal in the 1.57–1.60–$\mu$m Wavelength Region," Photonics Technology Letters, vol. 9, No. 5, May 1997, pp. 596–598.

Jin Hong Lim, et al. "Polymethine and Squarylium Molecules with Large Excited–State Absorption," Oct. 27, 1998, Chemical Physics 245(1999), pp. 79–97.

* cited by examiner

PASSIVELY OUTPUT FLATTENED OPTICAL AMPLIFIER

FIELD OF THE INVENTION

The present invention relates to optical amplifiers and specifically to optical amplifiers having an approximately constant output level with respect to input level.

BACKGROUND

Communications systems and specifically telecommunications systems often comprise optical amplifiers. These optical amplifiers are typically used to transmit digitally encoded optical signals over long distances. A popular type of optical amplifier used in communication systems is an optical amplifier comprising an optical fiber doped with a rare earth element, such as erbium. The erbium-doped fiber (EDF) is "pumped" with light at a selected wavelength, e.g., 980 nm, to provide amplification or gain at wavelengths within the low loss window of the optical fiber. However, one limitation of any rare-earth doped optical fiber amplifier is unequal gain over a range of frequencies or optical channels of interest, as well as for various input signal strengths.

Accordingly, optical amplifiers attempting to provide uniform spectral gain have been developed. In particular, optical amplifiers including an active optical filter (gain compensation filter) have been developed. Typically, these active optical filters selectively attenuate high gain wavelengths, while passing low gain wavelengths. However, optical amplifiers incorporating these gain compensation filters are unable to receive input optical signals over a wide range of power levels while maintaining substantially uniform gain at each wavelength.

Other attempts employ a multi-stage optical fiber amplifier for providing gain equalization. Typically, the amplifier comprises several stages of amplification where each stage comprises an amplifying fiber having a different gain spectrum. For example, prior art systems are known to comprise two stages of amplification, which are pumped separately. Each stage has a different dopant composition to provide a different gain spectrum. However, equalization is limited to a relatively narrow bandwidth.

Previous attempts to compensate for unequal gain of EDF amplifiers are typically complicated and require sophisticated calibration. Also, previous attempts comprise active components, which require additional power. Further, previous attempts tend to be adversely affected by fluctuations in environmental conditions, such as temperature and humidity. These adverse affects include more noise injected into the optical signal and increased bit error rate. (The bit error rate (BER) is a measure defined as the number of error bits divided by the total number of bits received in a given time period.) The performance of prior art systems is also known to deteriorate over time, thus requiring multiple iterations of calibration. Thus, a need exists for a robust optical amplifier, not requiring additional power to accommodate unequal gain, providing a low BER over time and fluctuating environmental-conditions.

SUMMARY OF THE INVENTION

An optical amplifier for amplifying at least one input signal and providing at least-one output signal includes a nonlinear light absorber for passively controlling the level of the output signal(s). The nonlinear light absorber provides an approximately constant output signal level independent of the level of the input signal.

BRIEF DESCRIPTION OF THE FIGURES

The invention is best understood from the following detailed description when read in connection with the accompanying drawing. The various features of the drawings may not be to scale. Included in the drawing are the following figures.

DETAILED DESCRIPTION

Figure 1:
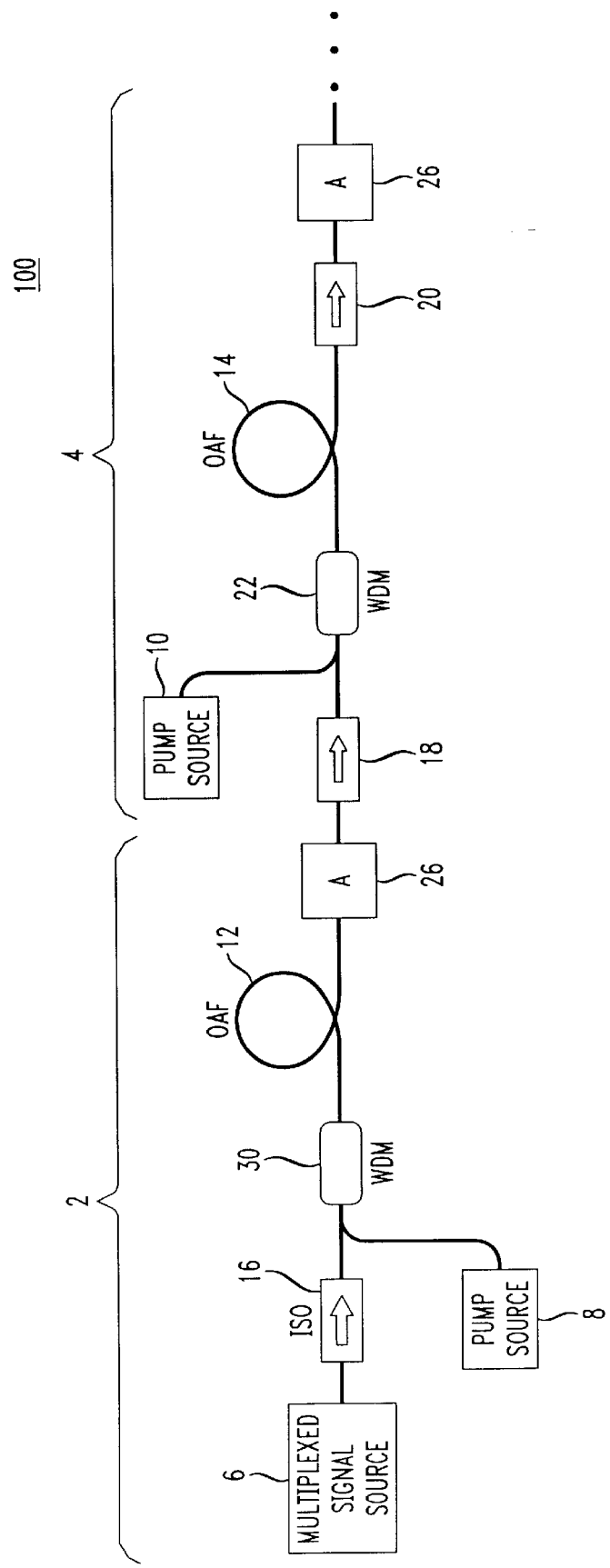
FIG. 1 is a block diagram of an exemplary optical fiber amplifier in accordance with the present invention.

FIG. 1 is a block diagram of two stages of an exemplary optical amplifier in accordance with the.present invention. The first stage 2 of optical amplifier 100 comprises multiplexed signal source 6, isolator 16, pump source 8, wavelength division multiplexer (WDM) 30, optical amplifying fiber 12, and nonlinear absorber 26. The second stage of optical amplifier 100 comprises isolators 18 and 20, pump source 10, WDM 22, optical amplifying fiber 14, and a second nonlinear absorber 26. Although two stages of amplification (i.e., stages. 2 and 4) are shown, an optical amplifier in accordance with the present invention may comprise only a single stage, or several stages of amplification. In an exemplary embodiment of the invention, optical amplifier 100 is part of a communications system.

The multiplexed signal source 6 provides multiple optical signals having different wavelengths sharing a common optical fiber. Source 6 may comprise any source of optical signals know in the art, including, but not limited to, broadband sources (e.g., tungsten bulb), light emitting diodes (LEDs), erbium-doped fibers, fixed-wavelength semiconductor laser sources, and tunable semiconductor laser sources. The optical signals of source 6 may be multiplexed in accordance with any appropriate scheme, such as the well known multiplexing schemes of wavelength division multiplexing and dense wavelength division multiplexing (DWDM).

Isolators 16, 18, and 20 transmit light in one direction and prevent back scattering and reflection of light. Typically, an isolator comprises linear polarizers, oriented such that light will propagate unimpeded in one direction, and is essentially blocked from propagating in the opposite direction. The placement and number of isolators shown in optical amplifier 100 is exemplary. Thus, more or less isolators may be implemented, and the placement may vary. Typically, isolators are used to prevent reflection and back scattering of light into devices, sensitive to same, such as lasers, LEDs, and amplifying fibers.

Optical amplifying fibers 12 and 14 amplify the multiplexed optical signals originating from multiplexed signal source 6. Optical amplifying fibers 12 and 14 represent the amplifying portions of optical amplifier 100. However, the amplifying portions of optical amplifier 100 may comprise any combination of optical amplifiers known in the art, such as semiconductor laser amplifiers. (e.g., Fabry-Perot amplifier, traveling-wave amplifier), and fiber amplifiers (e.g., erbium-doped amplifier).

In a preferred embodiment of the invention, optical amplifying fibers 12 and 14 comprise erbium-doped fibers (EDFs). EDFs 12 and 14 comprise the rare-earth element erbium as the active ingredient. Typically, only the core of the fibers 12 and 14 comprise erbium atoms. Light from an external source (e.g., laser) excites the erbium atoms, which is exploited to amplify an optical signal. An optical amplifier comprising EDFs (EDFA) operates at wavelengths from 1520 to 1630 nanometers (nm). In an exemplary embodiment, optical amplifier 100 amplifies multiplexed signals in two bands. The first band (C band) comprises a bandwidth of 1528 to 1565 nm, inclusively. The C band comprises forty multiplexed signals each having a different wavelength. The second band (L band) comprises a bandwidth of 1570 to 1610 nm, inclusively. The L band also comprises forty multiplexed signals each having a different wavelength.

Amplification occurs in optical amplifier 100 as a result of stimulated emission. Stimulated emission occurs when an electron of a material (e.g., erbium) dropping from a higher energy level to a lower energy level, emits (releases) the extra energy. Electrons in the higher energy level are stimulated to drop out of the energy level to the lower energy level by external energy (e.g., photon), thus emitting energy at the same wavelength (as the external energy).

In an exemplary embodiment of the invention, pump sources 8 and 10 are external sources exciting the EDFs 12 and 14, respectively. Pump sources 8 and 10 provide continuous optical energy for maintaining a population inversion of the erbium atoms in the EDFs 12 and 14. The optical energy provided by pump sources 8 and 10 is absorbed by the erbium atoms, thus raising them to excited states and therefore causing population inversion. When the multiplexed signal provided by multiplexed signal source 6, enters the erbium-doped core, it is amplified as a result of stimulated emission occurring in the EDFs 12 and 14. The excited erbium atoms are then stimulated, by the multiplexed signal, to emit optical energy at the erbium emission wavelength, thus amplifying the multiplexed signal. The multiplexed signal beam and the pumped optical energy beam propagate together down the fiber. The multiplexed signal beam continually increases in strength while the power of the pumped beam is depleted.

Figure 2A:
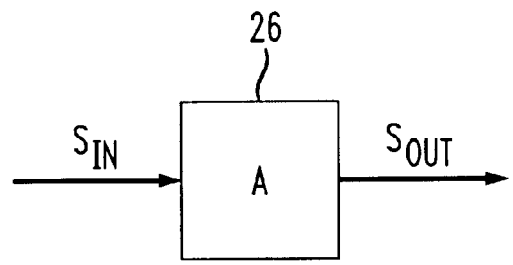
FIG. 2A is a diagram of an exemplary nonlinear light absorber in accordance with the present invention.
Figure 2B:
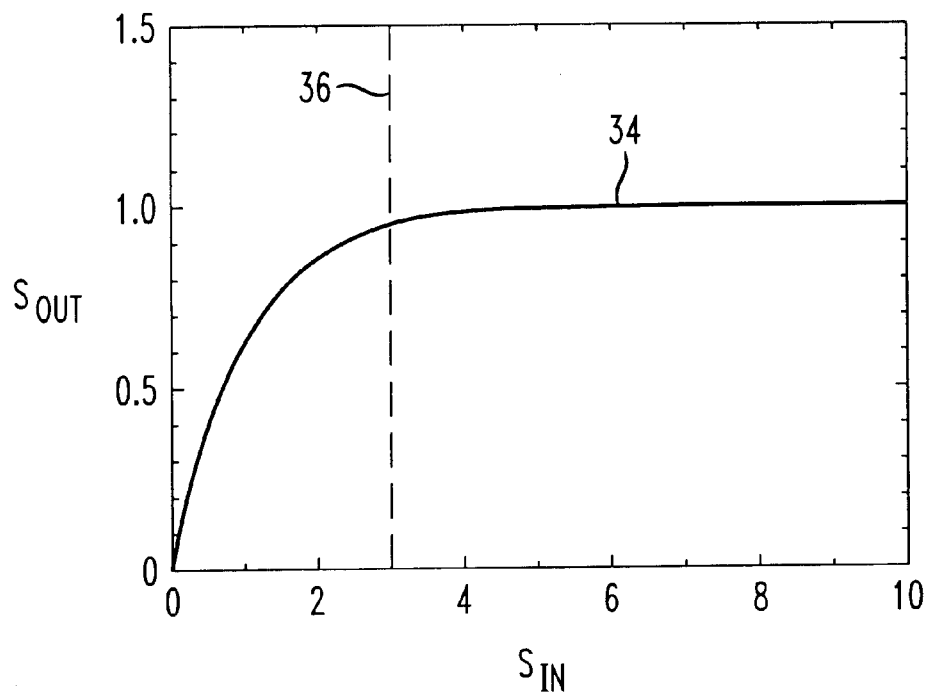
FIG. 2B is an exemplary graph of an output optical signal as a function an input optical signal provided by a nonlinear absorber in accordance with the present invention.

Absorbers 26 are nonlinear light absorbers. Referring to FIGS. 2A and 2B, the relationship between optical power (or intensity) provided 25 to the input of each nonlinear absorber and optical power (or intensity) provided at the output of each nonlinear absorber is shown. In FIG. 2A, $S_{IN}$ is an input signal provided to the input of nonlinear absorber 26, and $S_{OUT}$ is an output signal provided at the output of nonlinear absorber 26. $S_{IN}$ and $S_{OUT}$ may represent power or intensity or other similar parameter of $S_{IN}$ and $S_{OUT}$.

$S_{OUT}$ is a function of $S_{IN}$. An exemplary graph of this function is shown in FIG. 2B. Curve 34 represents $S_{OUT}$ as a function of $S_{IN}$ for a single wavelength. The units of $S_{IN}$ and $S_{OUT}$ are the same and arbitrary (e.g., power or intensity). As shown by curve 34, a region exists for which $S_{OUT}$ is approximately constant as a function of $S_{IN}$. This region is depicted as the region to the right of dashed line 36. Thus, curve 34 indicates that the value of $S_{OUT}$ is approximately 1.0 for all values of $S_{IN}$ greater than or equal to approximately 3. The general shape of curve 34 remains the same for various values of wavelength of $S_{IN}$ and $S_{OUT}$, although the values of power (or intensity) for $S_{IN}$ and $S_{OUT}$ may vary. Thus, in an exemplary embodiment of the invention, the 40 individual signals in the multiplexed signal provided by multiplexed signal 6, form a family of 40 curves 34. Each curve comprises a common region in which $S_{OUT}$ is approximately constant as a function of $S_{IN}$. Therefore, in an exemplary embodiment of the invention, the signal (power or intensity) provided at the output of optical amplifier 100 is approximately constant when the power or intensity of the signal provided to the input of optical amplifier 100 is above a threshold value. The threshold value is dependent above the specific properties of the nonlinear absorber 26.

Nonlinear absorber 26 may comprises any combination of nonlinear absorbers having the input to output relationship as shown by curve 34. Examples of such absorbers include reverse saturable absorbers and two-photon absorbers. Thus, the nonlinear absorber 26 in stage 2 of amplifier 100 may comprise a two-photon nonlinear absorber and the nonlinear absorber 26 used in stage 4 may comprise a reverse saturable absorber, or vice-versa, or both stages 2 and 4 may comprise the same type of nonlinear absorber 26.

Figure 3A:
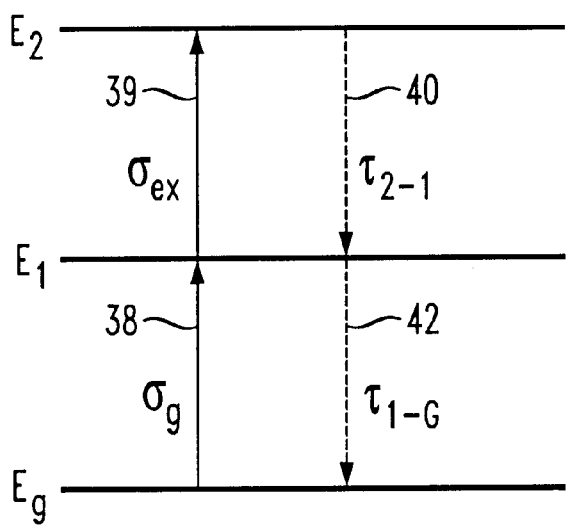
FIG. 3A is a diagram of energy levels of an exemplary reverse saturable absorber.in accordance with the present invention.

FIG. 3A is a diagram of energy levels of an exemplary reverse saturable absorber in accordance with the present invention. Three energy levels are shown, ground stage energy level, $E_G$, first energy level, $E_1$, and second energy level, $E_2$. Initially the molecules of the nonlinear absorber 26 are in the ground state energy level, $E_G$, which has the absorption cross section, $\sigma_g$. When irradiated by light of an appropriate wavelength, some of molecules are excited by linear absorption to the first excited energy level, $E_1$, as indicated by arrow 38. Once in energy level $E_1$, the molecules are further promoted to the second excited energy level $E_2$ by the excited absorption cross section, $\sigma_{ex}$, with increasing the incident light, as indicated by arrow 39. Subsequently, this excited state absorption occurs as a sequence of cascaded one-photon absorption processes. If $\sigma_{ex}$ is larger than $\sigma_g$, the overall light absorption rate increases as the incident light increases. In other words, light transmittance, which is the ratio of output to input, decreases with increasing the incident light, referred to as reverse saturable absorption (RSA). The FOM (figure of merit) for a RSA is typically described as the ratio of $\sigma_{ex}$ to $\sigma_g$ ($\sigma_{ex}/\sigma_g$). In an exemplary embodiment of the invention, this ratio is equal to or greater than 14. Once in energy level $E_2$, the molecules drop quickly to the first energy level $E_1$, as indicated by energy release arrows 40, or the original ground energy level, $E_G$, through first energy level, $E_1$, as indicated by energy release arrows 40 and 42.

In FIG. 3A, $t_{2-1}$ (i.e., decay rate) is the time that molecules remain in the second energy level $E_2$ before dropping to the first energy level $E_1$, and $t_{1-G}$ is the time that molecules remain in first energy level $E_1$ before dropping to energy level EG. First energy level, $E_1$, has a slower decay rate back to ground energy level $E_G$ (i.e., $t_{1-G}$), than the decay rate from the second energy level $E_2$ to the ground energy level $E_G$ (i.e., $t_{2-1}$). This relationship is represented mathematically, using the nomenclature of FIG. 3A, as: $t_{2-1} < t_{1-G}$. For example, $t_{2-1}$ may be on the order of picoseconds and $t_{1-G}$ may be on the order of nano-seconds. Thus a significant proportion of the molecules accumulate in the first energy level $E_1$, as the incident radiation increases. As the incident radiation increases, the excess radiation is absorbed by the increasingly populated energy level, $E_1$, which has the excited absorption cross section $\sigma_{ex}$ and the level of energy at the output of the nonlinear absorber 26 is adjusted to an approximately constant level. Accordingly, the output level of optical energy provided at the output of optical amplifier 100 is approximately constant. In particular, when inputs are pulse signals with pulsewidth on the order of nano-seconds or less, RSA efficiency is greatly increased.

Figure 3B:
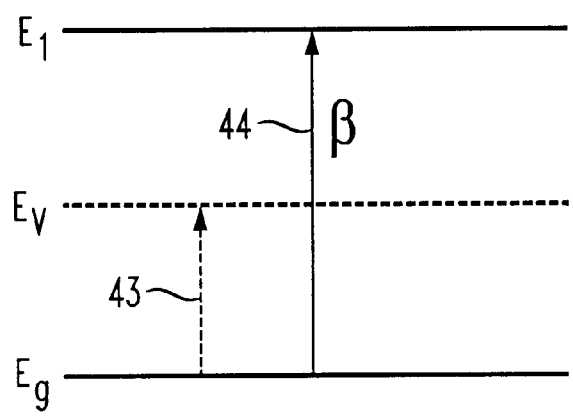
FIG. 3B is a diagram of energy levels of an exemplary two-photon absorber in accordance with the present invention.
Figure 4A:
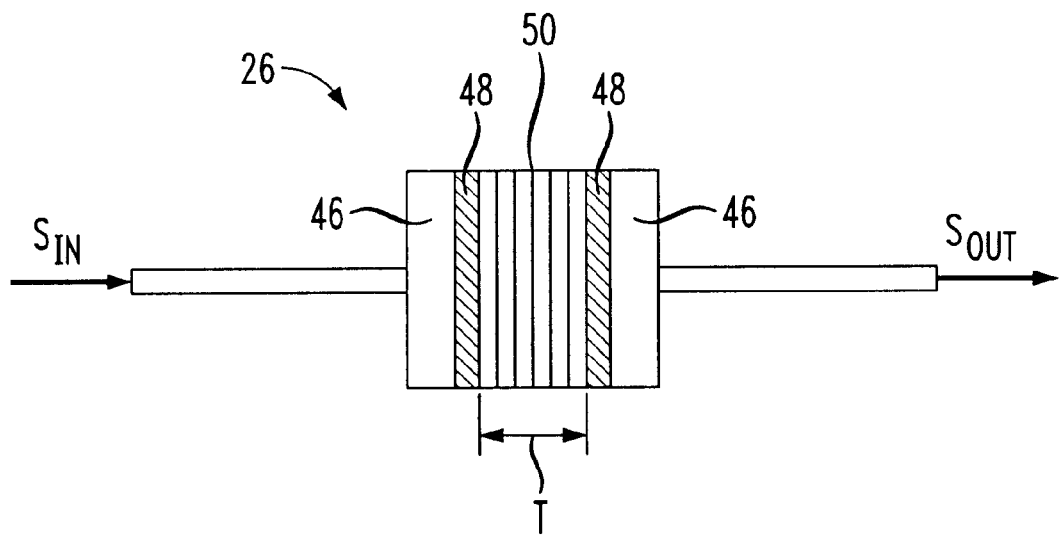
FIG. 4A is a diagram of an exemplary nonlinear absorber configured as an optical device in accordance With the present invention.

FIG. 3B is a diagram of energy levels of an exemplary two-photon absorber in accordance with the present invention. Two energy levels are shown, lower state energy level, $E_G$, and higher state energy level, $E_1$. Virtual energy level $E_V$ is considered only for explanation of the two-photon absorption. When irradiated by light of an appropriate wavelength at low intensity, molecules can not be normally promoted to higher energy level $E_1$ due to large energy gap ($E_1$–$E_G$) over the incident photon energy, hv, corresponding to ($E_V$–$E_G$), as indicated by arrow 43. Where h is the Planck constant and v is a photon frequency corresponding to incident light. However, as the incident input intensity increases or as the number of photons increases, some of molecules are promoted from energy level $E_G$ to energy level $E_1$ by absorbing photon energy corresponding to 2hv. Thus, nonlinear two-photon absorption occurs as a result of the high intensity of the incident light and two-photon-absorption coefficient, β, as indicated by arrow 44. The two-photon absorption coefficient l is dependent upon the material used and is defined by the following mathematical expression: $\beta=(S_{IN}-S_{OUT})/(S_{IN} \cdot S_{OUT} \cdot T)$, where $S_{IN}$ is incident intensity, $S_{OUT}$ is output intensity, and T is nonlinear absorber thickness, as indicated in FIG. 4A.

Figure 4B:
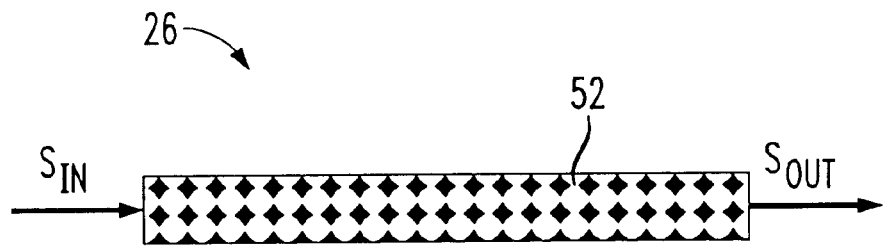
FIG. 4B is a diagram of an exemplary optical fiber doped with a nonlinear absorbing material in accordance with the present invention.

Nonlinear absorbers 26 may be formed in various configurations. FIGS. 4A and 4B are diagrams of an exemplary nonlinear absorber configured as an optical device and an optical fiber doped with a nonlinear absorbing material, respectively. The nonlinear absorber depicted in FIG. 4A comprises grin lenses 46, index matching material 48, and nonlinear absorbing material 50. Grin lenses 46 facilitate focusing and collimating optical energy propagating through nonlinear absorber 26. Index matching materials 48 facilitate reducing unwanted attenuation and distortion of optical energy propagating through nonlinear absorber 26. The use of and procedures for coupling grin lenses 46 and index matching materials 48 are well known in the optics art.

In an exemplary embodiment of the invention, the thickness, T, of nonlinear absorbing material 50 is varied to obtain a desired level of the output signal, $S_{OUT}$. As thickness, T, is decreased, the level of the output optical signal, $S_{OUT}$, increases because less optical energy is absorbed. Conversely, as thickness, T, is increased, the level of the output optical signal, $S_{OUT}$, decreases because more optical energy is absorbed. The nonlinear absorbing material 50 may comprises any combination of nonlinear absorbing materials exhibiting the input to output relationship as shown by curve 34. Appropriate materials include organic materials such as Polymethane molecules and Squarylium molecules, as well as metallo-organic materials such as Porphyrins. Polymethanes and squaryliums can be doped in elasto-polymeric materials such as PUA (polyurethane acrylate), PMMA (polymethyl methacrylate), or glass in order to maintain linear and nonlinear optical properties of the organic molecules. PUA and PMMA are more transparent than glass. Porphyrins can be doped in PMMA. In particular, changing chemically the number of pi-conjugate bonds of these organic and metallo-organic materials or adding impurities in these materials provide various linear and nonlinear optical absorption properties as well as absorption band.

FIG. 4B is a diagram of a nonlinear absorber 26 comprising an optical fiber doped with a nonlinear absorbing material 52. In an exemplary embodiment of the invention, the doping concentration of the nonlinear material 52 is varied to obtain a desired level of the output signal, $S_{OUT}$. As the doped concentration is decreased, the level of the output optical signal, $S_{OUT}$, increases because less optical energy is absorbed. Conversely, the doped concentration is increased, the level of the output optical signal, $S_{OUT}$, decreases because more optical energy is absorbed. The nonlinear absorbing material 52 may comprises any combination of nonlinear absorbing materials exhibiting the input to output relationship as shown by curve 34. In another embodiment of the invention, the length of nonlinear absorber 26 is varied to obtain a desired level of the output signal, $S_{OUT}$. The level of the output signal, $S_{OUT}$, may also be controlled by varying both the length of nonlinear absorbing fiber 26 and the doping concentration of the nonlinear absorbing material in nonlinear absorber 26. Appropriate materials include organic materials such as Polymethane molecules and Squarylium molecules, as well as metallo-organic materials such as Porphyrins. Polymethanes and squaryliums can be doped in elastopolymeric materials such as PUA (polyurethane acrylate), PMMA (polymethyl methacrylate), or glass in order to maintain linear and nonlinear optical properties of the organic molecules. PUA and PMMA are more transparent than glass. Porphyrins can be doped in PMMA. In particular, changing chemically the number of pi-conjugate bonds of these organic and metallo-organic materials or adding impurities in these materials provide various linear and nonlinear optical absorption properties as well as absorption band.

An optical amplifier 100 comprising a nonlinear absorber 26 in accordance with the present invention, is robust, does not require additional power to operate the nonlinear absorber 26, and provides good performance, as measured by BER, over a wide range of environmental conditions and long periods of time. These advantages are particularly suited to digital telecommunications systems. An optical amplifier 100 comprising a nonlinear absorber 26 in accordance with the present invention provides an output signal level, which remains approximately constant as environmental factors vary. For example, the level of the output signal of the optical amplifier 100 remains approximately constant as temperature and/or humidity fluctuate. This is due primarily to the fact that the nonlinear absorbing materials are not significantly affected by temperature and humidity.

Nonlinear light absorber 26 is a passive device, requiring no extra power to operate. Also, the absorption properties of the nonlinear absorbing materials used in nonlinear absorber 26 do not deteriorate over time. Thus, the level of the output signal remains approximately constant over time. Whereas, the performance of prior art optical amplifiers is known to deteriorate over time resulting in an increased bit error rate (BER). Therefore, an optical amplifier 100 comprising a nonlinear absorber 26 in accordance with the present invention requires less power than prior art systems, and provides a low, approximately constant BER over long periods of time.

Further, an optical amplifier in accordance with the present invention provides approximately constant output signal levels. Whereas, prior art systems attempt to provide approximately constant gain. Thus, the output signal levels of prior art systems are not independent of the input signal levels. Rather, prior art output signal levels are related to the input signal levels by the gain factor of the prior art amplifier. An optical amplifier in accordance with the present invention, provides approximately constant output signal levels, independent of the input signal levels, within the amplifier's operational band.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An optical amplifier for amplifying at least one input signal and providing at least one output signal, said amplifier comprising at least one nonlinear light absorber for passively controlling a level of said at least one output signal, wherein said level of said at least one output signal is approximately constant independent of a level of said at least one input signal.

2. An optical amplifier in accordance with claim 1, wherein said nonlinear light absorber provides reverse saturable absorption.

3. An optical amplifier in accordance with claim 1, wherein said nonlinear light absorber provides two-photon absorption.

4. An optical amplifier in accordance with claim 1, wherein said nonlinear light absorber is an optical fiber doped with a nonlinear absorbing material.

5. An optical amplifier in accordance with claim 4, wherein said level of said at least one output signal is adjusted by varying at least one of a length of said optical fiber doped with a nonlinear absorbing material and a doping concentration of said nonlinear absorbing material.

6. An optical amplifier in accordance with claim 1, wherein said nonlinear light absorber is a nonlinear absorbing device comprising at least one grin lens and a nonlinear absorbing material.

7. An optical amplifier in accordance with claim 6, where said output signal level is adjusted by varying the thickness of said nonlinear absorbing material device.

8. An optical amplifier in accordance with claim 1, wherein an operational bandwidth is between 1528 and 1565 nanometers, inclusively.

9. An optical amplifier in accordance with claim 1, wherein an operational bandwidth is between 1570 and 1610 nanometers, inclusively.

10. An optical amplifier in accordance with claim 1, wherein said optical amplifier comprises at least one erbium-doped fiber.

11. An optical amplifier in accordance with claim 10 further comprising:
    at least one pump source for providing optical energy to said erbium-doped fiber;
    at least one isolator for attenuating reflected optical energy; and
    at least one wavelength division multiplexer for multiplexing said at least one input signal and said optical energy provided by said at least one pump source.

12. An optical amplifier in accordance with claim 1, wherein said nonlinear light absorber comprises material selected from the group consisting of polymethane, squarylium, porphyrin, polyurethane acrylate, polymethyl methacrylate, and glass.

13. A communications system operating within at least one of 1528 to 1565 nanometers, inclusively and 1570 to 1610 nanometers, inclusively, said system comprising:
    an optical amplifier for amplifying a plurality of multiplexed input signals and providing a plurality of multiplexed output signals, said amplifier comprising:
        at least one erbium-doped fiber for amplifying said plurality of input signals;
        at least one nonlinear light absorber for passively controlling a level of said plurality of multiplexed output signals, said nonlinear light absorber providing an approximately constant level of said plurality of multiplexed output signals independent of a level of said plurality of multiplexed input signals;
        at least one pump source for providing optical energy to said at least one erbium-doped fiber;
        at least one isolator for attenuating reflected optical energy; and
        at least one wavelength division multiplexer for multiplexing said plurality of multiplexed input signals with said optical energy provided by said at least one pump source.

* * * * *